Aug. 3, 1954
M. D. KING
2,685,398
MATERIAL CONTAINING OR SUPPORTING MEANS
Filed April 14, 1950
3 Sheets-Sheet 1
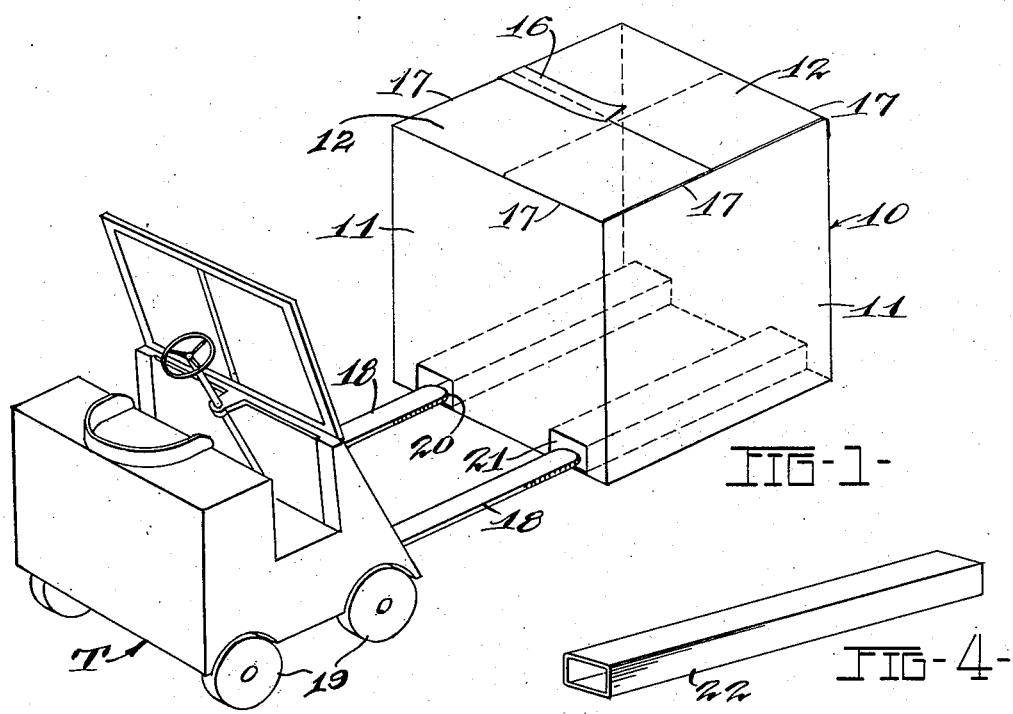
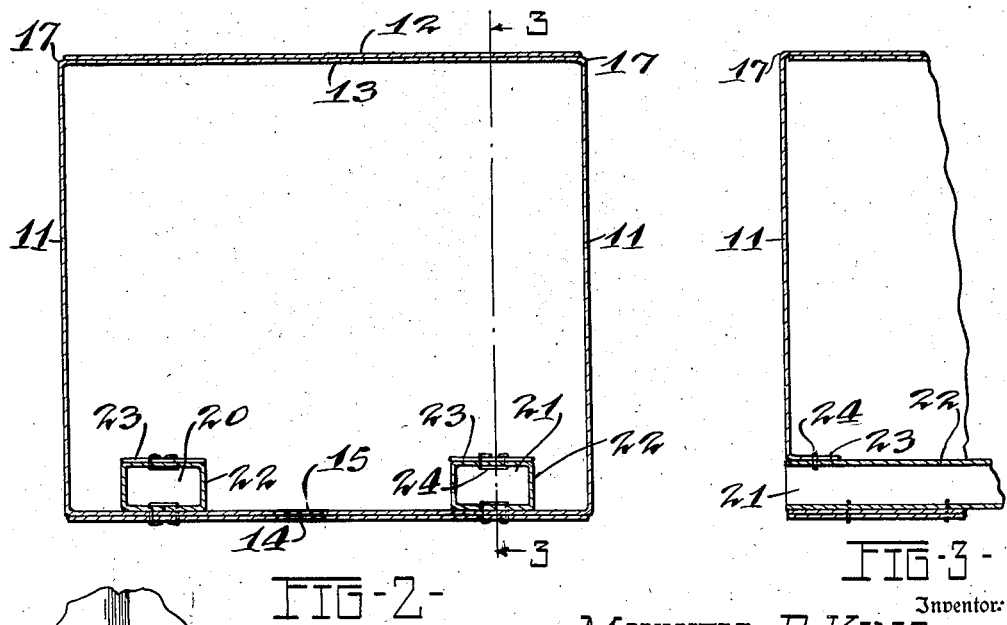
Inventor:
MAXWELL D. KING.
By Harry O. Ernsberger
Attorney Aug. 3, 1954 M. D. KING 2,685,398
MATERIAL CONTAINING OR SUPPORTING MEANS
Filed April 14, 1950 3 Sheets-Sheet 2
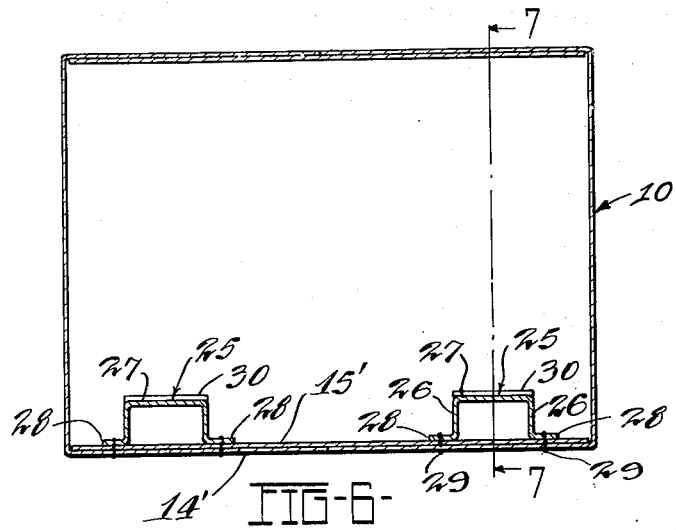
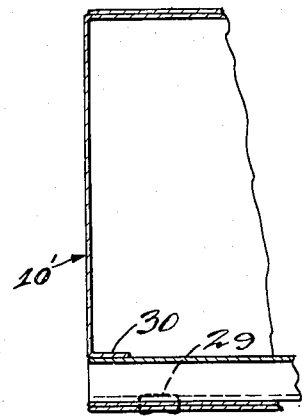
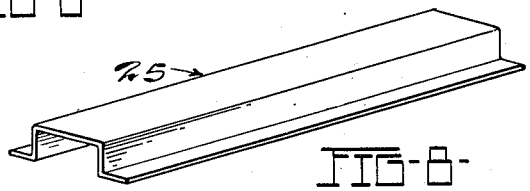
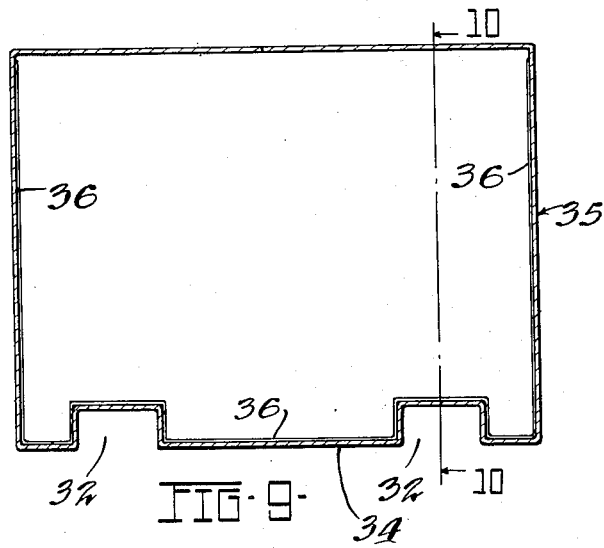
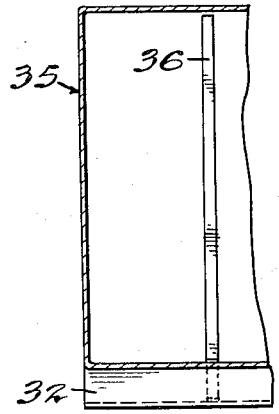
Inventor:
MAXWELL D. KING.
By Harry O. Ernsberger
Attorney Aug. 3, 1954 M. D. KING 2,685,398
MATERIAL CONTAINING OR SUPPORTING MEANS
Filed April 14, 1950 3 Sheets-Sheet 3
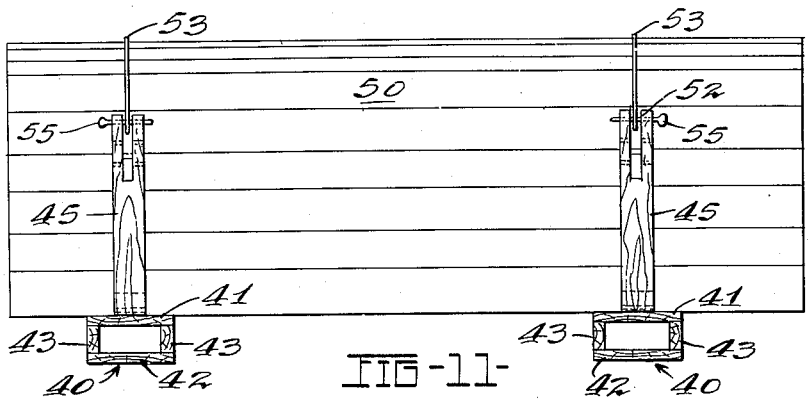
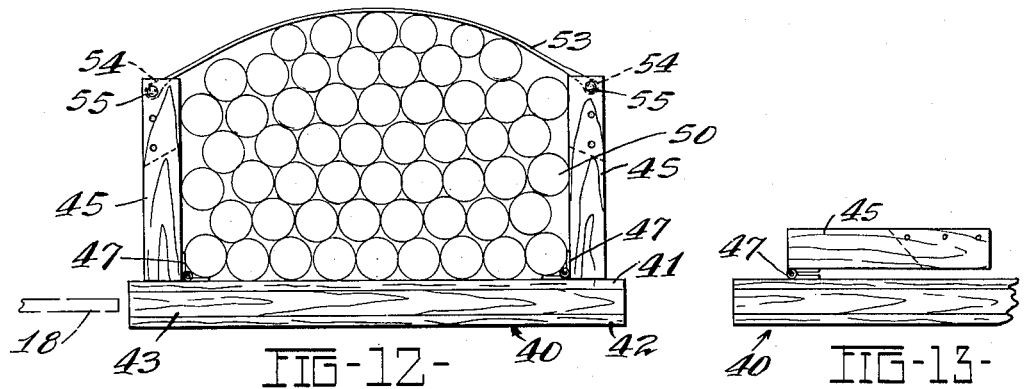
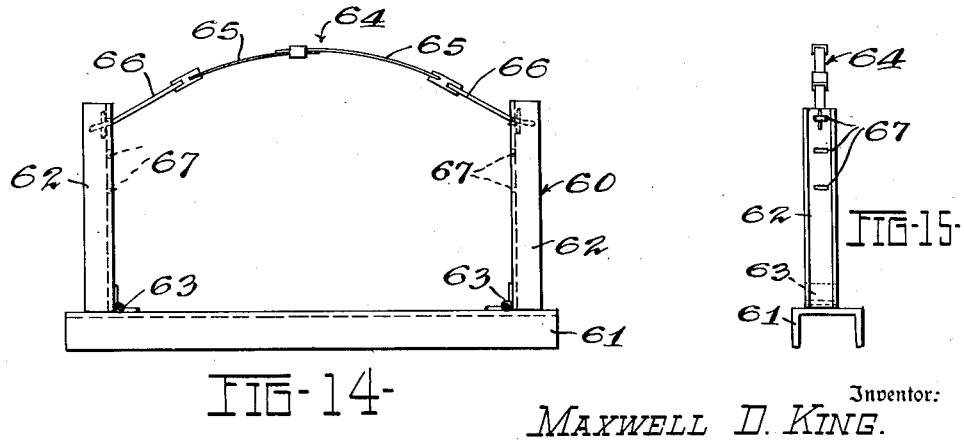
Inventor:
MAXWELL D. KING.
By Harry O. Ernsberger
Attorney Patented Aug. 3, 1954

2,685,398

UNITED STATES PATENT OFFICE 2,685,398

MATERIAL CONTAINING OR SUPPORTING MEANS

Maxwell D. King, Toledo, Ohio

Application April 14, 1950, Serial No. 155,838

3 Claims. (Cl. 229—6)

This invention relates to the art of packaging or handling materials and more especially to material containing or supporting means configurated to be readily engaged and transported by a material moving instrumentality.

It has been conventional practice to employ container or material supports known as pallets, the latter being formed with a raised material supporting surface, the space beneath the surface being adapted to receive the forks or pallet engaging bars of a so-called lift or industrial truck for transporting the pallet and items or materials supported or stacked thereon. The pallets occupy considerable storage space which might otherwise be advantageously and economically used for material storage. Furthermore in material handling operations involving the use of pallets, it is necessary to return the pallets to the supplier of items or materials to be transported thereon thus increasing the weight of the freight load and hence the cost of material transportation.

The present invention embraces the provision of a novel method and means for packaging or supporting materials to facilitate handling and transporting the same.

The invention contemplates the provision of an article or material supporting or containing means configurated to accommodate lifting or load engaging and transporting elements of a prime mover wherein there is provided additional space for articles to be transported.

Another object is the provision of an article or package container or supporting means configurated with suitable tunnels or chambers to receive and accommodate material handling and trasporting devices.

Another object of the invention is the provision of a material containing medium fashioned to accommodate a handling and transporting instrumentality with a minimum of sacrifice of packaging or material storage space.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an isometric view illustrating a form of material packaging or material containing medium of my invention and a material handling and transporting instrumentality showing a method of utilizing the latter with my invention;

Figure 2 is a transverse sectional view showing structural features of the material containing medium illustrated in Figure 1;

Figure 3 is a fragmentary detail sectional view taken substantially on the line 3—3 of Figure 2;

Figure 4 is an isometric view illustrating one of the elements of the material containing medium;

Figure 5 is a fragmentary isometric view illustrating an intermediate step in the formation of the material containing medium shown in Figures 2 and 3;

Figure 6 is a longitudinal sectional view showing a modified form of material containing medium of the invention;

Figure 7 is a fragmentary sectional view taken substantially on the line 7—7 of Figure 6;

Figure 8 is an isometric view illustrating an element of the construction shown in Figures 6 and 7;

Figure 9 is a sectional view similar to Figure 6 illustrating another form of material containing medium;

Figure 10 is a fragmentary sectional view taken substantially on the line 10—10 of Figure 9;

Figure 11 is a side elevational view illustrating another form of material supporting medium of my invention;

Figure 12 is an end elevational view of the construction shown in Figure 11;

Figure 13 is a fragmentary view illustrating a collapsed or stored position of the construction shown in Figures 11 and 12;

Figure 14 is a view similar to Figure 12 illustrating another form of the invention, and Figure 15 is an end view of the arrangement shown in Figure 14.

Referring to the drawings in detail and first with reference to the form of the invention shown in Figures 1 through 5 there is illustrated a form of material containing medium suitable to receive and contain articles to be packed or packaged therein to facilitate transportation thereof. The material containing medium or receptacle 10 is preferably of square prism configuration having vertical side and end walls 11, top wall portions 12, 13 and bottom wall portions 14, 15. The four side walls, top and bottom portions may be made of a single sheet of material such as heavy cardboard or container board formed so that the top and bottom portions overlap to provide a double thickness. The abutting edges of the top sections 12 and bottom sections 14 may be joined by a sealing strip 16 which may be of cloth treated with a suitable adhesive to form a joint, a portion of one of the strips being illustrated in Figure 1. The end portions of the container may be formed as continuations of the side walls 11 or they may be independent sections connected to the side walls by suitable conventional securing means such as by gluing, stapling or the like. The portions 12 and 13 forming the top wall are in effect hinged at the corners 17, that is, at their juncture with the upper edges of the side walls 11. In order to introduce or pack objects or articles in the container, the top sections 12 and 13 may be swung to open position to provide for access to the interior of the container for packing or removing articles or materials.

Means are provided associated with the container or receptacle 10 for receiving or accommodating instrumentalties for transporting the container and contents thereof without the use of separate pallets or other extraneous means for initially elevating the carton. As particularly illustrated in Figures 2 through 4, I have provided parallel tunnel or channel configurations adapted to receive the tines or load engaging projections 18 of an industrial lift truck T of conventional type. The industrial truck embodies a source of power (not shown) adapted to selectively elevate and lower the load engaging projections or arms 18, or establish a drive to the supporting wheels 19 for moving the truck for material transferring purposes. The tunnel configurations dseignated 20 and 21 are formed by tubular members 22 preferably of rectangular cross section, one of the members being shown in Figure 4. As shown in Figures 1 and 2, two of the members are embodied in the container 10, spaced laterally in the manner illustrated in Figure 1.

Members 22 may be formed of sheet metal, wood, fiberboard, carton board or any material preferably of relatively light weight yet having sufficient distance to adequately support the its contents when the projections 18 of the load moving truck are in engagement therewith. In this form of construction the end walls of the container 10 are provided with rectangular openings to admit the tubular members 22. The portions 23 of the container end walls adjacent the openings are bent inwardly as shown in Figures 2, 3 and 5 and may be secured to the members 22 by clips 24. The portions 23 may be secured to the members by gluing or other suitable securing means. The tunnels or chambers 20 and 21 formed by the tubular members are spaced a proper distance to receive the load elevating projections 18 carried by the load moving truck or instrumentality T. When the projections 18 have been entered into the chambers 20 and 21 by forward movement of the truck a sufficient distance to adequately support the container 10, the mechanism of the truck T is then operated in a manner to move the load engaging projections 18 upwardly whereby the projections engage the upper walls of the tunnel configurations to lift the entire container and items or materials packed thereon. By this means of embodying tubes or tunnels in the material containing medium 10, it may be quickly and readily transported without extraneous container supporting pallets, platforms or the like. The applicant's construction as compared with a standard container affords increased space for packaging of items as the channel portions within the container adjacent the sides of the tunnel walls may be utilized to receive items for packaging thus attaining increased usable space in the receptacle.

Figures 6 through 8 illustrate a modified form of container 10' wherein the tunnel configuration may be provided through the utilization of members 25 generally of U-shaped cross section. The members 25 are each formed with side walls 26, a connecting web or wall 27, and laterally extending flanges 28. The flanges 28 may be secured to the bottom walls 14' and 15' by staples 29 or other fastening means. The channel shaped members 25 may be formed of sheet metal, heavy cardboard, fiber board or other material endowed with adequate strength characteristics to support the materials contained in the receptacle 10' when the projections 18 of the truck T are in operative engagement with the upper walls 27 of the members. The portions 30 produced by forming the openings in the end walls of the container may extend inwardly and be secured to the walls 27 of the members 25.

Another form of the invention is shown in Figures 9 and 10 and is similar to that shown in Figure 6 differing in the respect that the lower wall boundaries of the tunnel constructions have been eliminated whereby the tunnels are not closed rectangular chambers but are in the form of U-shaped grooves 32 formed by configurating the bottom wall 34 of the container 35 as illustrated in Figure 9. In this form, the wall portions of the receptacle or package are preferably reinforced by means of metal wires or bands 33 or other suitable reinforcing means, which may be bonded or integrated with the container walls. The receptacle 35 may be elevated and transported by projecting the bars 18 of the truck into the spaces 32 in the same manner as herein explained in connection with other forms of the invention.

Figures 11 through 13 illustrate a form of the invention for supporting rods, tubes or elongated articles in a manner to facilitate elevation and transportation thereof by means of an industrial truck or similar instrumentality. In this form of the invention two tunnel-like constructions or tubes 40 preferably of rectangular cross section and made of wood are adapted to be spaced in an initial position to receive and accommodate the projections or folks of the load transporting instrumentality. Each of the constructions includes a tunnel configuration preferably of rectangular cross section made up of upper and lower members 41 and 42 and connecting side walls 43. Each of the tunnel configurations 40 is provided at the ends with upright members or rack posts 45 which are hinged to the tunnel shaped constructions 35 by means of hinges 47. The purpose of the hinge construction is to facilitate folding the posts 45 into a stored or collapsed position out of use in parallelism longitudinally of the member 40 as illustrated in Figure 13.

As this form of the invention is particularly usable for handling and transporting bar stock, rods or elongated members 50 of various character, it is desirable to provide means to secure the materials against shifting. The upper ends of the posts 45 may be slotted as at 52 to receive the ends of a strap or tie 53 which may be of metal, rubber or other suitable material depending upon the strength and resiliency desired for retaining the materials against shifting. The strap is preferably formed with eye configurations 54 to receive securing pins 55 in the manner shown in Figures 11 and 12.

Figures 14 and 15 illustrate a construction 60 similar to that shown in Fgure 12 fabricated of metal elements. In this form, each material support is inclusive of a channel member 61 carrying rack posts 62 also of channel configuration secured to the channel member 61 by means of hinges 63. The constructions are utilized in pairs in the manner illustrated in Figure 11. When the posts 62 are in upright position, linear materials may be stacked on the channel members 61 between the posts 62 in the manner illustrated in Figure 12, the channel members 61 being spaced to receive the load carrying arms 18 of the truck. Means are provided to secure the stacked articles against shifting during transportation. The securing means 64 illustrated in Figures 14 and 15 is inclusive of metal strips 65 which are connected to resilient bands or strips 66 the latter being preferably of rubber to provide for a degree of resiliency to yieldingly bias the retaining means into engagement with the materials to be transported. The racks or posts 62 may be provided with a series of openings 67 in which the rubber bands or strips 66 may be selectively anchored. The bands may be anchored in any pair of openings depending upon the height of the stack of the articles carried by the supporting construction. In the use of this form of the invention a pair of the material supporting constructions 60 are spaced a proper distance to receive and accommodate the projections or load engaging elements of the industrial truck. Bars, tubes or other linear materials are then stacked upon the upper surface of the channel members 61, the posts 60 providing lateral support for the articles. After a desired number of articles have been stacked, the article securing means 64 may then be applied by anchoring the rubber band elements 66 in the proper selected openings in the posts 62 so that a downwardly active biasing force is exerted upon the stack of articles to prevent dislodgement or shifting thereof. The projections 18 of the load transporting medium T may then be inserted in the tunnel configuration provided by members 66, the load supporting projections then operated to lift the members 61 above a floor or other supporting surface after which the truck may be moved to transport the articles to a different zone.

With this form of the invention there is provided a lightweight yet effective means for supporting a stack of elongated articles wherein the articles themselves provide the means for holding the load supporting constructions in proper spaced relation to accommodate the projections of a load moving instrumentality. The tunnel constructions are easily stored when not in use by folding the posts 62 into parallelism with the channel members 61 through the facility of the hinges 63 so that in stored position the load supporting elements occupy a comparatively small space.

It is apparent that, within the scope of the invention, modifications and different arrangements may be made other than is herein disclosed, and the present disclosure is illustrative merely, the invention comprehending all variations thereof.

What I claim is:

1. A shipping container having a base and side walls, tabs cut in each of said opposite side walls and bent inwardly forming opposed openings in said opposite side walls at the juncture of said base and side walls, a plurality of parallel members comprising top and side walls located within said container and rigidly connected to said base and said tabs to form open-ended tubes the ends of which cooperate with the opposed openings in said opposite side walls to provide receiving means for the load engaging projections of a lift truck.

2. A shipping container having a base and side walls, tabs cut in each of said opposite side walls and bent inwardly forming opposed openings in said opposite side walls at the juncture of said base and side walls, a plurality of parallel open-ended tubes within said container rigidly connected to said base and said tabs, the ends of which cooperate with the opposed openings in said opposite side walls to provide receiving means for the load engaging projections of a lift truck.

3. A shipping container having a base and side walls, tabs cut in each of said opposite side walls and bent inwardly forming opposed openings in said opposite side walls at the juncture of said base and side walls, a plurality of parallel channels within said container having their ends connected to said tabs, said channels having flanges thereon rigidly connected to said base, said channels forming in conjunction with said base open-ended tubes the ends of which cooperate with the opposed openings in said opposite side walls to provide receiving means for the load engaging projections of a lift truck.

References Cited in the file of this patent

UNITED STATES PATENTS

| Number | Name | Date |
|---|---|---|
| 930,216 | McClung | Aug. 3, 1909 |
| 1,336,973 | Levene | Apr. 13, 1920 |
| 1,922,560 | Sullivan | Aug. 15, 1933 |
| 2,195,236 | Brunt | Mar. 26, 1940 |
| 2,197,859 | Freed | Apr. 23, 1940 |
| 2,276,800 | Sprague | Mar. 17, 1942 |
| 2,388,730 | Fallert | Nov. 13, 1945 |
| 2,471,693 | Lilienfeld | May 31, 1949 |
| 2,479,728 | Darling | Aug. 23, 1949 |
| 2,489,054 | Sprolle | Nov. 22, 1949 |
| 2,494,730 | Thursby | Jan. 17, 1950 |
| 2,517,939 | Stewart | Aug. 8, 1950 |